(12) United States Patent
Beckley et al.

(10) Patent No.: US 7,619,576 B2
(45) Date of Patent: Nov. 17, 2009

(54) SELF-CONTAINED RADIO APPARATUS FOR TRANSMISSION OF DATA

(75) Inventors: John Peter Beckley, Oxfordshire (GB); Victor Alexandrovich Kalinin, Oxford (GB); George P. O'Brien, Piedmont, SC (US); Arthur R. Metcalf, West Bay (CA)

(73) Assignee: Michelin Recherche et Technique S.A., Granges-Paccot (CH)

( * ) Notice: Subject to any disclaimer, the term of this patent is extended or adjusted under 35 U.S.C. 154(b) by 980 days.

(21) Appl. No.: 10/843,145

(22) Filed: May 11, 2004

(65) Prior Publication Data

US 2004/0263416 A1    Dec. 30, 2004

(51) Int. Cl.
*H01Q 1/12* (2006.01)
(52) U.S. Cl. ............... 343/718; 343/795; 343/873; 152/152.1
(58) Field of Classification Search ............ 343/895, 343/700 MS, 795, 718, 846, 873, 885, 890, 343/892; 152/152.1
See application file for complete search history.

(56) References Cited

U.S. PATENT DOCUMENTS

| | | | | |
|---|---|---|---|---|
| 4,754,285 A * | 6/1988 | Robitaille | ............... | 343/718 |
| 5,144,325 A * | 9/1992 | Kurcbart | ............... | 343/718 |
| 5,270,722 A * | 12/1993 | Delestre | ............ | 343/700 MS |
| 5,844,523 A * | 12/1998 | Brennan et al. | ....... | 343/700 MS |
| 6,181,280 B1 * | 1/2001 | Kadambi et al. | ...... | 343/700 MS |
| 6,222,489 B1 * | 4/2001 | Tsuru et al. | ........... | 343/700 MS |
| 6,249,254 B1 * | 6/2001 | Bateman et al. | ....... | 343/700 MS |
| 6,329,951 B1 * | 12/2001 | Wen et al. | ................ | 343/702 |
| 6,346,913 B1 * | 2/2002 | Chang et al. | .......... | 343/700 MS |
| 6,480,171 B1 * | 11/2002 | Huang | ................... | 343/860 |
| 6,670,924 B1 * | 12/2003 | Shoji et al. | ............ | 343/702 |
| 6,677,907 B2 * | 1/2004 | Shoji et al. | ............ | 343/702 |
| 6,860,303 B2 * | 3/2005 | Rensel et al. | ............ | 152/152.1 |
| 6,899,153 B1 * | 5/2005 | Pollack et al. | ........... | 152/152.1 |
| 2002/0030628 A1* | 3/2002 | Tsai | ..................... | 343/702 |
| 2002/0171591 A1* | 11/2002 | Beard | ................... | 343/702 |
| 2002/0196190 A1* | 12/2002 | Lim | .................. | 343/700 MS |
| 2004/0001030 A1* | 1/2004 | Huang et al. | ............. | 343/895 |

* cited by examiner

*Primary Examiner*—Don Wong
*Assistant Examiner*—Angela M Lie
(74) *Attorney, Agent, or Firm*—Dority & Manning, P.A.

(57) ABSTRACT

A self-contained radio apparatus for the transmission of data includes a resiliently deformable patch, a resiliently deformable antenna carried by the patch, a post secured to the patch and upstanding from an upper surface of the patch, the post providing at an end remote from the patch a mounting for a radio device, and, electrical conductors extending from the antenna to the end of the post remote from the patch for operably connecting the antenna to a radio device mounted on the post. The radio apparatus is useful for attaching to objects that undergo bending stresses, such as tires.

11 Claims, 2 Drawing Sheets

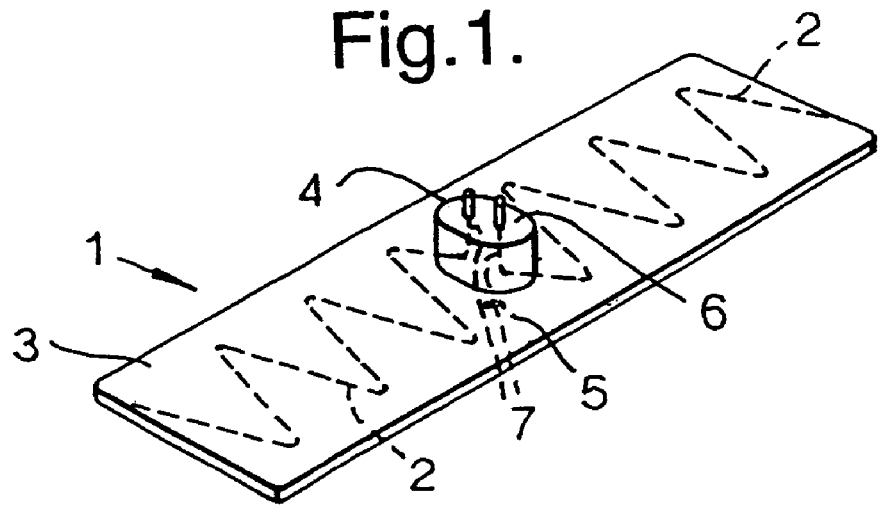
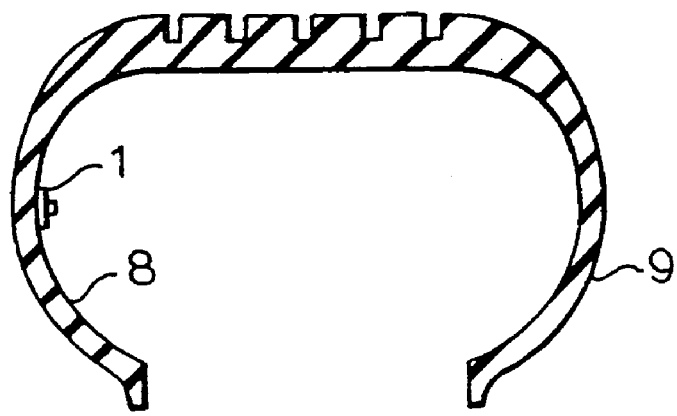
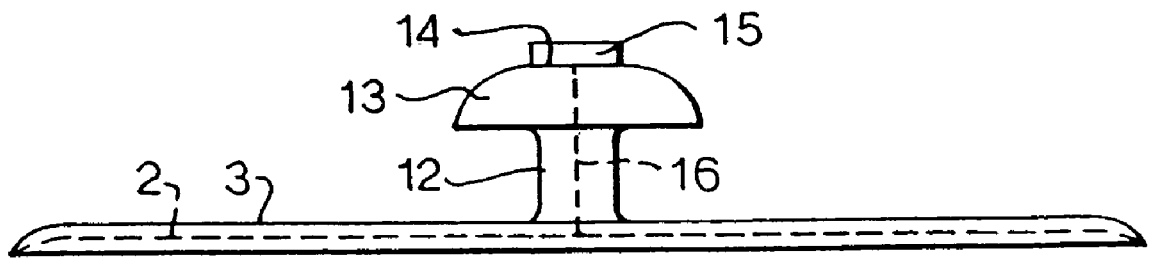

Antenna connection

10

Antenna connection

11

Antenna connection

SELF-CONTAINED RADIO APPARATUS FOR TRANSMISSION OF DATA

FIELD OF THE INVENTION

This invention relates to radio apparatus, and more particularly to self-contained radio apparatus for transmission of data.

BACKGROUND AND SUMMARY

United Kingdom patent application GB-A-231546 proposes various arrangements whereby radio apparatus is used for transmitting data. The radio apparatus used comprises two elements, first, a radio device which is the source of the data to be transmitted, and secondly one or more antennae used for communication with the radio device. U.S. Pat. No. 6,217,683 to Balzer et al. discloses a monitoring device for a tire that is contained in a rigid package and mounted on a patch having a stand-off element.

While combinations of antennae and radio and/or sensor devices can readily be produced under laboratory conditions for testing purposes, implementation of antennae and radio device combinations in relatively hostile environments presents substantial practical difficulties.

One environment which gives rise to particular problems is that of vehicle tires. The electronic monitoring of tires, for identification and condition, has become important in recent years. Although a radio device may be used, for example, to generate radio signals indicative of the temperature or pressure within a vehicle tire or to provide information as to the history of usage of the tire, the environment of a vehicle tire presents a number of difficulties in the implementation of radio technology to communicate with the radio device. In particular, at the frequencies typically used for this type of radio device the antenna required will, in general, be flexible and will be several tens of centimeters in length. In contrast, the sensor package will be rigid and very small—typically less than 10 mm square and less than 5 mm thick.

Because of the size of the antenna it must, as a practical matter, be secured to or embedded in the material of the tire. This material is subject to significant flexing as the wheel carrying the tire rotates. This repeated flexing makes it very difficult to provide reliable connections between the antenna and the relatively small rigid package.

The present invention avoids the problem outlined above by providing self-contained radio apparatus for the transmission of data, the apparatus comprising: a resiliently deformable patch in which is embedded, or upon the surface of which is secured a deformable antenna: a stiffened region on one major face of the patch, the stiffened region providing a mounting for a radio device which provides data for transmission by the antenna; and electrical conductors extending from the antenna into the stiffened region for connection to the package.

The stiffened region resists bending to provide a protective mounting for the package, while the less stiff surrounding parts of the patch allow flexing for compliance with the tire. According to a first embodiment, the stiffened region is provided by a raised land portion, preferably to about twice the thickness of the surrounding patch area. Other manners of stiffening a region of the patch may be used, for example, ribs may be formed in the patch. Also, stiffening materials, such as fibers, may be incorporated in the stiffened region.

According to an alternative embodiment, the stiffened region may comprise a post upstanding from a major face of the patch, the post providing at the end thereof remote from the patch a mounting for the radio device. The provision of a post which is upstanding from one major surface of the patch provides a mounting means at the end thereof remote from the patch which is substantially de-coupled from the mechanical strain to which the patch may be subject in use. Essentially, even if the strain imposed on the patch is transmitted to the base of the post, very little of such strain will be transmitted to the end of the post remote from the patch.

In a particularly preferred embodiment of the invention the patch, including a raised land portion, ribs, or post, is formed integrally of a resiliently deformable material, for example a rubber.

In a particularly preferred use of the invention the patch is adhesively secured on the major surface thereof opposite to that from which the post extends to the inside of a tire. By suitably choosing the material of the patch, the patch will readily conform to the interior surface of the tire and can be adhesively bonded thereto using conventional adhesive techniques. The radio device may be secured to the post after the patch has been secured to the tire or, in the preferred embodiment, during manufacture of the apparatus. In other words, a complete radio apparatus comprising antenna and radio device is assembled with the patch and post during manufacture to produce a complete unit which can readily be retrofitted to an existing tire by means of conventional adhesive techniques. The ability to provide the complete radio apparatus as a pre-formed assembly which can easily be secured in position using unskilled labor is a substantial practical advantage of the invention.

BRIEF DESCRIPTION OF THE DRAWINGS

The invention will be better understood from the following description of a preferred embodiment thereof given by way of example only, reference being had to the accompanying drawing wherein:

FIG. 1 illustrates schematically a preferred embodiment of the invention;

FIG. 2 illustrates mounting of the embodiment of FIG. 1 on the interior surface of a vehicle tire;

FIG. 6 illustrates a side view of an alternative embodiment of the invention.

DETAILED DESCRIPTION

Figure 3:
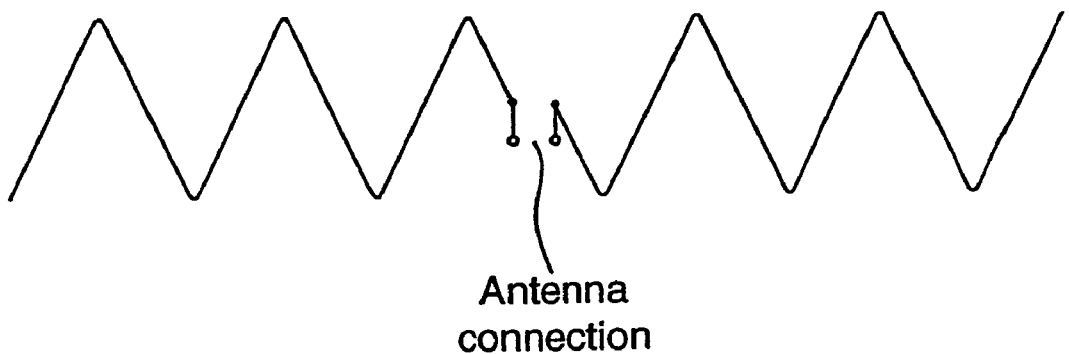
FIGS. 3, 4 and 5 show possible forms of antenna layout.

Referring firstly to FIG. 1 the illustrated apparatus 1 comprises a zig-zag dipole antenna 2 which is molded into a patch 3 of suitable resilient deformable material, for example a silicone rubber. The antenna 2 is formed of a suitably deformable material, for example, a flexible wire braid. The combination of this material and the shape of the antenna means that as the patch 3 is strained the dipole antenna is able to deform without difficulty.

Formed integrally with the patch 3, and of the same material as the patch 3, is a post 4 which extends upwardly from one major face 5 of the patch. The length of the posts, measured from the surface of the patch 3, is such that the end 6 of the post remote from the patch 3 will be substantially decoupled from all mechanical strain to which the patch 3 is subject in use. The end 6 of the post 4 provides a mounting for a package comprising a sensor or other data source, together with means, for example, surface acoustic wave devices, to generate appropriate radio signals for transmission by the antenna 2. Wires 7 provide pins which project from the post 4 for connection to the package. The wires 7 are connected to the antenna 2.

In use, the apparatus described is secured, for example by adhesive, to the inside surface 8 of a vehicle tire 9. It will be appreciated that in use of the tire the area to which the patch is secured exhibits substantial repeated deformation. Because of the resiliently flexible nature of the patch 3 and the deformable nature of the antenna 2, this deformation can readily be accommodated. However, the package which is mounted atop the post 4 is substantially decoupled from the strain to which the patch is subject and accordingly robust electrical connections to the wires 7 can readily be provided.

Figure 4:
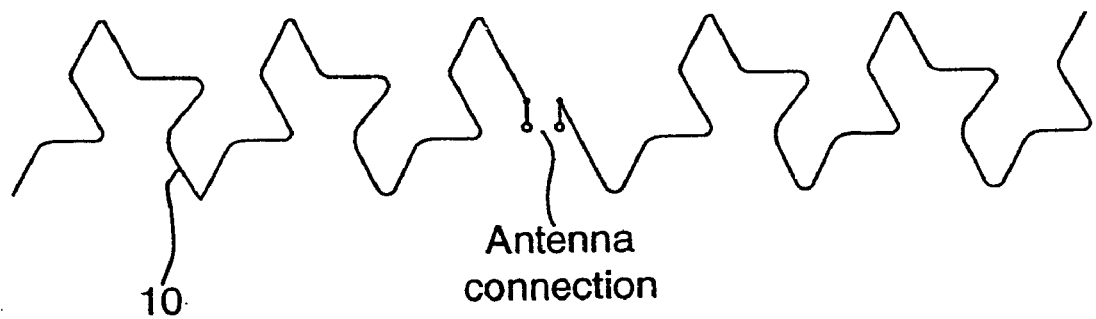
Figure 5:
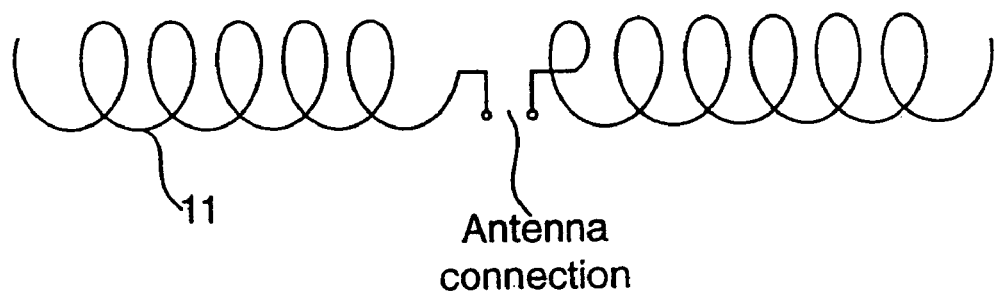

FIGS. 3, 4 and 5 show various proposals for the antenna 2. The zig-zag arrangement illustrated in FIG. 1 is shown in more detail in FIG. 3. In FIG. 4 an antenna form 10 is shown comprising a repeating pattern of straight portions interconnected by alternate acute and obtuse angle bends. In FIG. 5 a coil antenna 11 is shown. In order to accommodate the antenna within a relatively thin patch the turns of the antenna in FIG. 5 are collapsed on top of each other. In this case, the wire from which the antenna is made is insulated or care is taken to provide an insulating layer between the collapsed turns of the coil.

Referring to FIG. 6, a further embodiment of the invention is shown. In this case the patch 3 and antenna 2 are substantially as described above with reference to FIG. 1. The post, however, consists of a shaft 12 and a mushroom head 13. The patch 3, shaft 12 and mushroom head 13 are formed as an integral molding of suitable material, for example, silicone rubber. The effect of this arrangement is to provide a mounting area 14 which manifests very little strain despite substantial changes in shape imposed on the patch 3 by deformation of the tire to which it is secured. A radio package 15 comprising a sensor is secured to the surface 14 and is connected by wires 16 to the antenna.

While the invention has particular utility in the context of tire mounted devices, the invention is not limited to such applications. Indeed, although the invention has been designed primarily with a view to accommodating repeated strain within the antenna zone, the invention may be used in applications where no substantial strain occurs. For example, the flexible nature of the patch makes the device ideal to be secured to either flat or curved surfaces. In this connection, the ability of the invention to be pre-formed as a complete unit comprising antenna and radio package under optimum assembly conditions, and then to apply the package in its use position under general manufacturing or site conditions, offers a very substantial advantage. Effectively, complete apparatus can be manufactured and tested under well controlled conditions appropriate to the assembly of electronic equipment.

The complete unit once manufactured and tested can be deployed either to an alternative manufacturing plant (for example a tire factory) to be secured to another device by simple assembly techniques which may be performed by unskilled or semi-skilled operatives. Further, the highly flexible nature of the patch means that the complete assembly can be applied under circumstances where conventional relatively rigid assemblies would not be suitable. For example, the patch could be formed into a wrist band to form an identity device for wear by a human or animal. Also, the patch may provide a means of mounting the entire device on the exterior surface of shafts and pipes by means of simple adhesive or mechanical fast techniques.

What is claimed is:

1. A self-contained radio apparatus for the transmission of data, comprising:
   a resilient deformable patch;
   a resilient deformable antenna carried by the patch;
   a post secured to the patch and upstanding from an upper surface of the patch; and,
   electrical conductors extending from the antenna to the end of the post remote from the patch for operably connecting the antenna to a radio device mounted on the post.

2. A radio apparatus according to claim 1, wherein the antenna is embedded in the patch.

3. A radio apparatus according to claim 1, wherein the antenna is mounted on a surface of the patch.

4. A radio apparatus according to claim 1, wherein the post and patch are integrally formed.

5. A radio apparatus according to claim 1, wherein a lower surface of the patch includes an adhesive for securing the apparatus to a working surface.

6. A radio apparatus according to claim 1, wherein the antenna comprises a zig-zag shaped antenna which is formed of resiliently deformable material.

7. A radio apparatus according to claim 1, wherein the antenna comprises a meandering shaped antenna which is formed of resiliently deformable material.

8. A radio apparatus according to claim 1, wherein the antenna comprises a substantially linear antenna which is formed of resiliently deformable material.

9. The radio apparatus according to claim 1, wherein the patch is formed of an elastomeric material.

10. A radio apparatus according to claim 9, further comprising a coating of electrically insulating material on the antenna to electrically insulate it from the patch material.

11. A radio apparatus according to claim 1, wherein the post extends a distance from the patch sufficient to substantially decouple the end remote from the patch from mechanical strain developed in the patch.

* * * * *